(12) United States Patent
MacLean

(10) Patent No.: US 12,201,245 B2
(45) Date of Patent: Jan. 21, 2025

(54) ERGONOMIC SERVING UTENSIL WITH TILTING RECEPTACLE

(71) Applicant: Michael MacLean, Chicago, IL (US)

(72) Inventor: Michael MacLean, Chicago, IL (US)

( * ) Notice: Subject to any disclaimer, the term of this patent is extended or adjusted under 35 U.S.C. 154(b) by 280 days.

(21) Appl. No.: 17/736,314

(22) Filed: May 4, 2022

(65) Prior Publication Data
US 2023/0355041 A1 Nov. 9, 2023

(51) Int. Cl.
*A47J 43/28* (2006.01)
*B25G 3/38* (2006.01)

(52) U.S. Cl.
CPC .............. *A47J 43/281* (2013.01); *B25G 3/38* (2013.01)

(58) Field of Classification Search
CPC ................................ A47J 43/281; B25G 3/38
USPC ............................................................ 30/324
See application file for complete search history.

(56) References Cited

U.S. PATENT DOCUMENTS

| | | | | |
|---|---|---|---|---|
| 843,372 A * | 2/1907 | Smith | ................... | A47G 21/04 30/324 |
| 3,208,144 A | 9/1965 | Cronheim | | |
| 4,028,803 A * | 6/1977 | Currie | ................... | A47G 21/08 30/321 |
| 4,040,185 A * | 8/1977 | Jacobi | ................... | A47J 43/281 210/474 |
| 5,894,668 A * | 4/1999 | Cooke | ................... | A47J 43/281 30/324 |
| 10,842,324 B2 * | 11/2020 | Cheng | ................... | A47J 43/281 |
| 11,369,231 B2 * | 6/2022 | Fortin | ................... | A47G 21/04 |
| 2005/0257381 A1 * | 11/2005 | Currie | ................... | A47G 21/08 30/324 |
| 2007/0079514 A1 * | 4/2007 | Currie | ................... | A47G 21/02 30/324 |
| 2008/0276466 A1 * | 11/2008 | Currie | ................... | A47G 21/02 192/66.1 |
| 2011/0088266 A1 * | 4/2011 | Currie | ................... | A47G 21/08 30/324 |
| 2022/0225840 A1 * | 7/2022 | Fordham | ............... | A47J 19/005 |

FOREIGN PATENT DOCUMENTS

| | | |
|---|---|---|
| CN | 108433487 A | 8/2018 |
| KR | 200180093 Y1 | 4/2000 |
| WO | WO 02/089647 A1 | 11/2002 |

* cited by examiner

*Primary Examiner* — Omar Flores Sanchez
(74) *Attorney, Agent, or Firm* — Crowell & Moring LLP

(57) ABSTRACT

The present embodiments provide a handheld device for transferring a substance. In example embodiments, a handheld device for transferring a substance includes a receptacle configured to receive and hold the substance. The receptacle is pivotably mounted to a handle about at least one pivot point, thereby forming an axis of rotation of the receptacle. The receptacle is rotatable about the axis of rotation in response to an external force being applied to an outer surface of the receptacle.

20 Claims, 3 Drawing Sheets

FIG. 2
FIG. 3
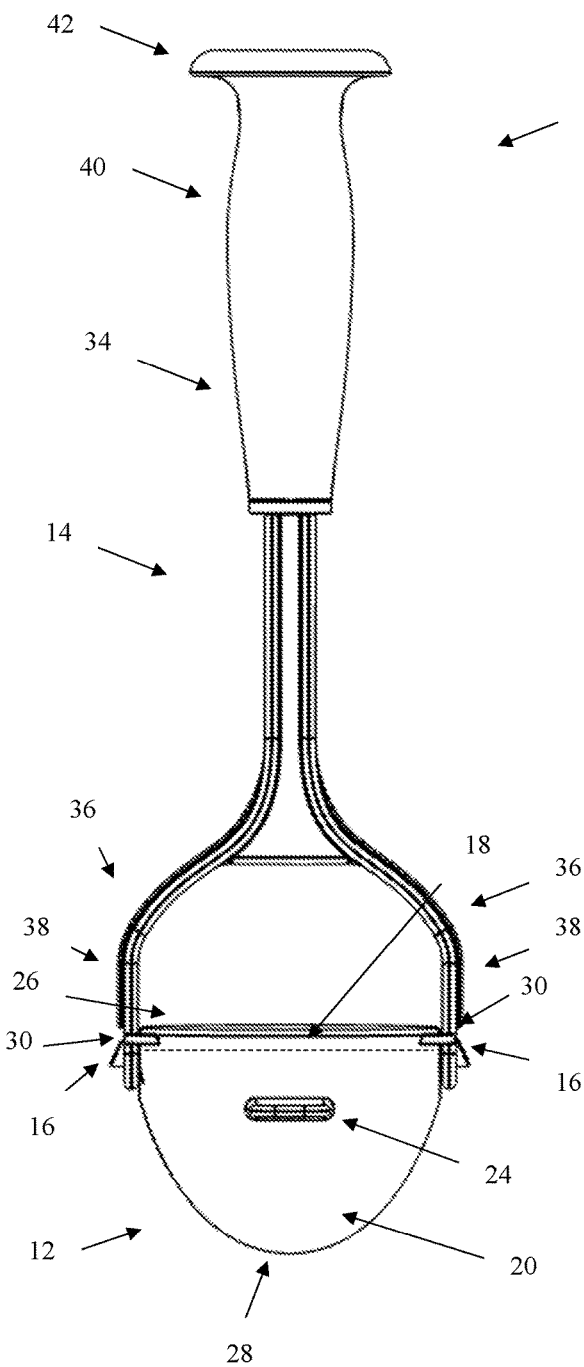
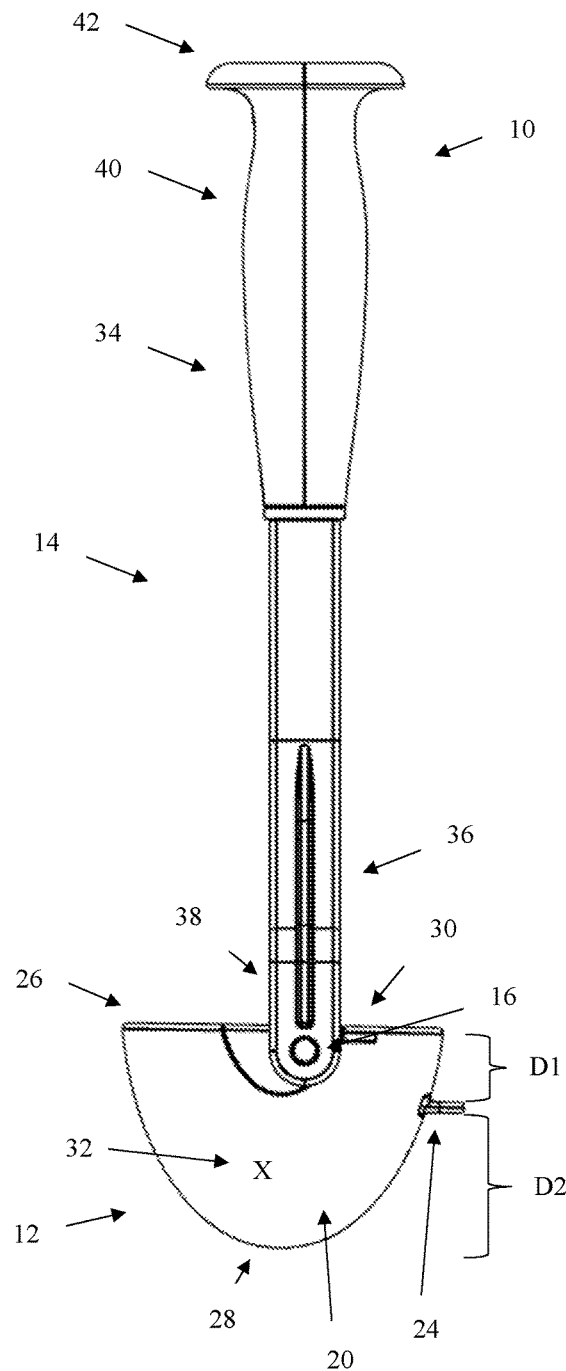

FIG. 4
FIG. 5
FIG. 6
FIG. 7
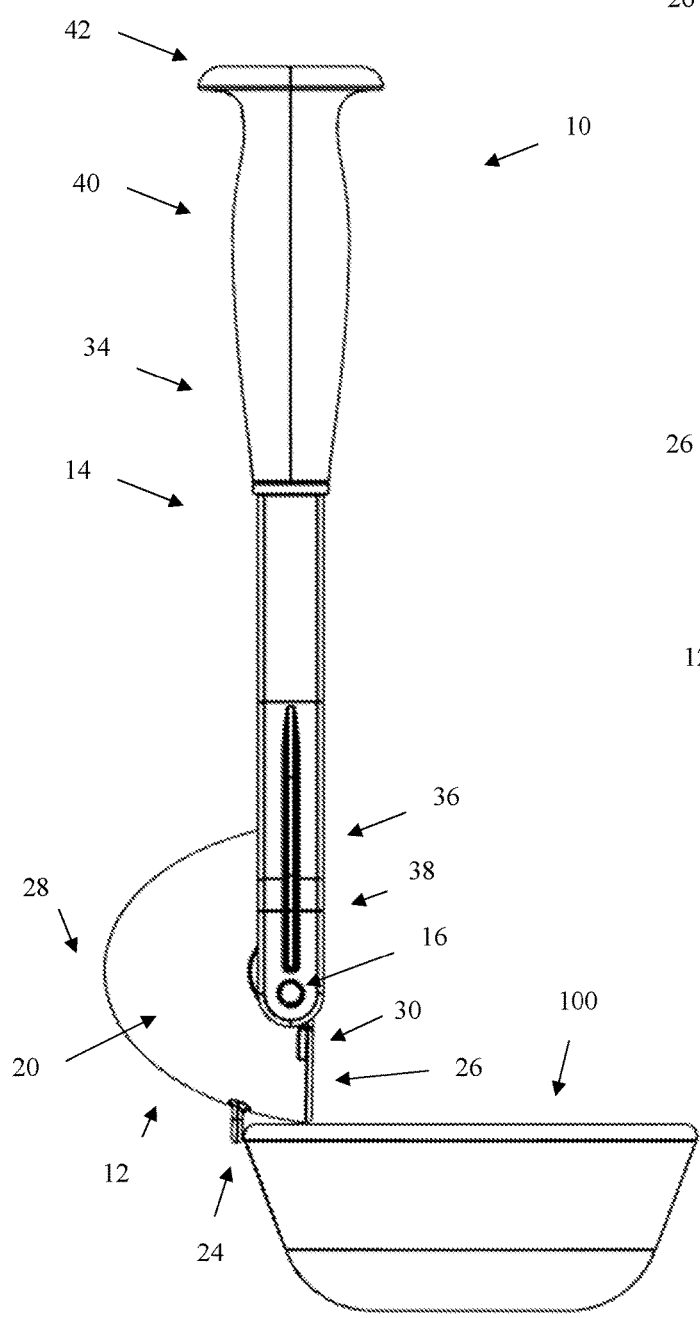
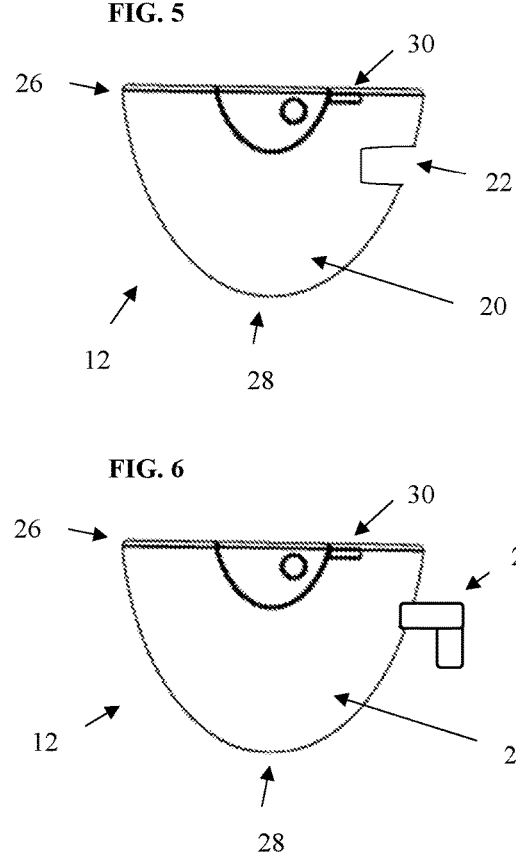
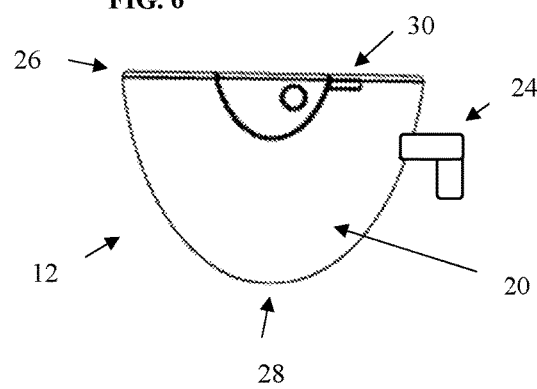
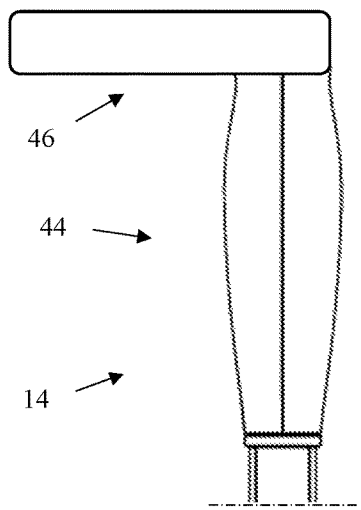

ERGONOMIC SERVING UTENSIL WITH TILTING RECEPTACLE

BACKGROUND

The present disclosure generally relates to kitchen utensils and tools. More particularly, the present disclosure relates to soup ladles that assist people with arthritis and/or limited hand or wrist mobility to easily transfer substances from a first vessel to a second vessel.

Soup ladles have been a common kitchen utensil found throughout the world, dating back to the fourth century. A soup ladle is a handheld device usually consisting of a handle with a receptacle to transfer substances from a cooking vessel to a serving vessel. Soup ladles can be made from various materials, including but not limited to stainless steel, silver, plastics, glass, wood, and ceramics.

Despite being around for thousands of years, soup ladles have remained essentially unchanged. There is a need for a soup ladle that can be used by people with arthritis in their wrists or having other conditions causing limited mobility. Additionally, as adults age, the uncomfortable motion of flexing their wrists to use a soup ladle becomes more and more difficult. The present disclosure addresses this problem and others by providing a handheld utensil for transferring a substance that reduces the flexing of a wrist.

SUMMARY

The present embodiments provide a handheld device for transferring a substance. In one aspect, a handheld device for transferring a substance includes a receptacle configured to receive and hold the substance. The receptacle is pivotably mounted to a handle about at least one pivot point, thereby forming an axis of rotation. The receptacle is rotatable about the axis of rotation in response to an external force applied to an outer surface of the receptacle.

In some embodiments, the handheld device may include the outer surface further comprising an indentation or a depression. In other embodiments, the handheld device may include the receptacle further comprising an extension extending outward in a first direction perpendicular to the axis of rotation. The extension may also further extend at least partially in a second direction perpendicular to the axis of rotation and the first direction. Additionally, the extension may be located a first distance from a top edge of the receptacle and a second distance from a bottom of the receptacle, the second distance being greater than the first distance.

The handheld device may include the receptacle pivotably mounted to the handle about two pivot points form the axis of rotation therebetween. The device may also include the handle having a perpendicular orientation relative to the axis of rotation. Further, the handle may comprise a first portion extending in a first direction perpendicular to the axis of rotation and a second portion extending at least partially in a second direction perpendicular to both the axis of rotation and the first direction.

In some embodiments, the handheld device may include the receptacle further comprising at least one protrusion. The receptacle may be rotatable about the axis of rotation between a first position, where the at least one protrusion is in contact with the handle preventing rotation in a first direction, and a second position, where the at least one protrusion is not in contact with the handle and the receptacle is rotatable in the first direction and a second direction. In other embodiments, the handle may further comprise at least one protrusion. The receptacle may be rotatable about the axis of rotation between a first position, where the at least one protrusion is in contact with the receptacle preventing rotation in a first direction, and a second position, where the at least one protrusion is not in contact with the receptacle and the receptacle is rotatable in the first direction and a second direction.

In example embodiments, the handheld device may include at least one of the handle and receptacle further comprising at least one protrusion extending outwardly therefrom, the extension on a same side of the axis of rotation as the at least one protrusion. The handheld device may also include the receptacle further comprising a center of mass offset from the axis of rotation.

In another aspect, a handheld device for transferring a substance includes a receptacle configured to receive and hold the substance. The receptacle is pivotably mounted to a handle about at least one pivot point, thereby forming an axis of rotation of the receptacle. The axis of rotation is offset relative to a center of mass of the receptacle. Further, at least one of the receptacle and the handle includes at least one protrusion. The receptacle is rotatable about the axis of rotation between a first position, where the at least protrusion is in contact with at least one of the handle and the receptacle preventing rotation in a first direction, and a second position, where the at least one protrusion is not in contact with at least one of the handle and the receptacle and the receptacle is rotatable in the first direction and a second direction.

The handheld device may include the handle having a perpendicular orientation relative to the axis of rotation. The handle may also be in a vertical alignment relative to the axis of rotation when the at least one protrusion is in contact with at least one of the handle and the receptacle. The receptacle may be rotatable about the axis of rotation in response to an external force applied to an outer surface of the receptacle as well.

In yet another aspect, a handheld device for transferring a substance includes a receptacle configured to receive and hold the substance. The receptacle is pivotably mounted to a handle about two pivot points, thereby forming an axis of rotation of the receptacle therebetween. The handle has a perpendicular orientation relative to the axis of rotation.

The handheld device may include the receptacle further comprising a center of mass offset from the axis of rotation. The device may also include at least one of the receptacle and the handle comprising at least one protrusion. The receptacle may be rotatable about the axis of rotation between a first position, where the at least one protrusion is in contact with at least one of the handle and the receptacle preventing rotation in a first direction, and a second position, where the at least one protrusion is not in contact with at least one of the handle the receptacle and the receptacle is rotatable in the first direction and a second direction. Additionally, the device may include the handle further comprising an elongated portion and two extensions extending from the elongated portion, the two pivot points being formed at a distal end of each extension.

The handled device may include any one or more of the aforementioned features. Other devices, systems, methods, features, and advantages of the described embodiments will be, or will become, apparent to one with skill in the art upon examination of the following figures and detailed description. It is intended that all such additional devices, systems, methods, features, and advantages be within the scope of the disclosure and encompassed by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

FIGS. 2-4 are side perspectives of the handheld device of FIG. 1;

FIG. 5 is a side perspective of a receptacle of a handheld device for transferring a substance according to alternative embodiments;

FIG. 6 is a side perspective of a receptacle of a handheld device for transferring a substance according to alternative embodiments; and FIG. 7 is a side perspective of a handle of a handheld device for transferring a substance according to alternative embodiments.

DETAILED DESCRIPTION

Figure 1:
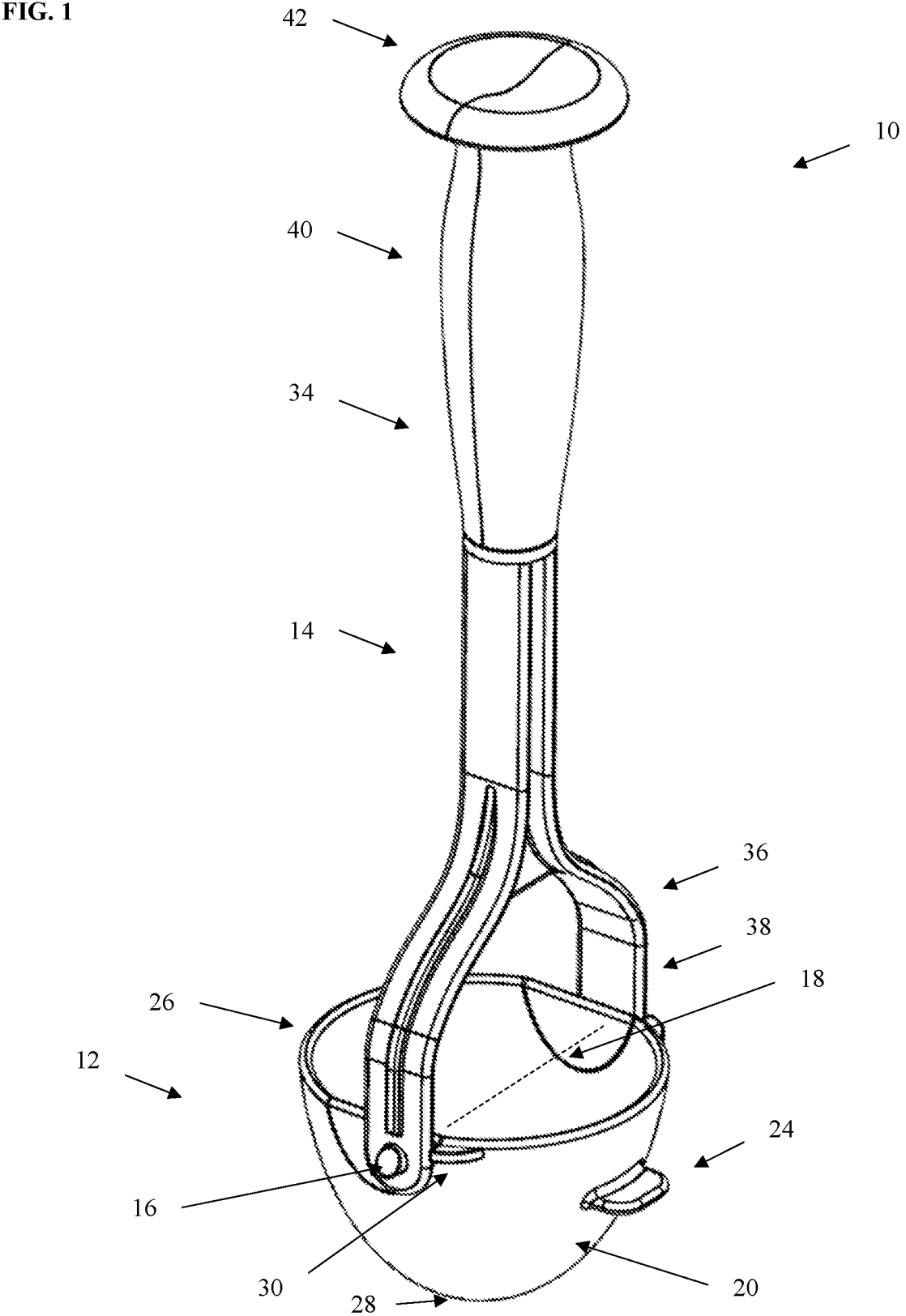
FIG. 1 is a perspective of a handheld device for transferring a substance according to certain embodiments.

In the present application, the term "proximal" refers to a direction that is generally toward a user's hand, while the term "distal" refers to a direction that is generally towards a receptacle of a handheld device during use of the handheld device. As used herein to describe example embodiments, the term "substance" may refer to a liquid, solid, gas, or some combination thereof. The terms "suitable for" and "configured for" are not merely statements of intention but rather denote being constructed and dimensioned, with concrete structural limitations that will be understood by those of skill in the art with reference to the present disclosure.

Referring now to FIGS. 1-4, in example embodiments, a handheld device 10 for transferring a substance is shown. Generally, handheld device 10 has a receptacle 12 and a handle 14. Receptacle 12 is pivotably mounted to handle 14 about at least one pivot point 16, thereby forming an axis of rotation 18 of receptacle 12. Receptacle 12 also has an outer surface 20, a top edge 26, a bottom 28, and a center of mass 32. Alternatively, center of mass 32 is the center of gravity, or the point where the force of gravity acts, assuming a uniform gravitational field. In the figures, center of mass 32 is illustrated by an "X." This illustration is merely exemplary, and center of mass 32 may be located elsewhere, except as specified herein. Receptacle 12 is configured to receive and hold a substance (for example, liquid soups or stews, and/or solid foods, such as rice) and transfer the substance from a first vessel to a second vessel. For example, the first vessel is a large cooking dish that receptacle 12 is dipped in to receive the substance, and the second vessel is a smaller serving dish where the substance is transferred to.

Receptacle 12 is rotatable about axis of rotation 18 in response to an external force applied to outer surface 20. As depicted in FIG. 4, receptacle 12 has been rotated 90° about axis of rotation 18 in response to an external force from a vessel 100. The rotation of receptacle 12 transfers a substance held within receptacle 12 to vessel 100. Certain example embodiments include an extension 24 extending outward from outer surface 20 in a first direction perpendicular to axis of rotation 18. Extension 24 assists receptacle 12 to contact vessel 100 and rotate receptacle 12 about axis of rotation 18. Referring to FIG. 6 specifically, in other example embodiments, extension 24 further extends at least partially in a second direction perpendicular to axis of rotation 18 and the first direction. As depicted in FIG. 4, in example embodiments, a first distance D1 between top edge 26 and extension 24 is less than a second distance D2 between bottom 28 and extension 24. By having extension 24 located where second distance D2 is greater than first distance D1, unwanted rotation of receptacle 12 is minimized when removing receptacle 12 from a first vessel after receiving a substance from the first vessel. Unwanted rotation is minimized by extension 24 being closer to axis of rotation 18, which shortens the moment arm, creating less torque to rotate receptacle 12 when removing receptacle 12 from the substance contained in the first vessel. Referring to FIG. 5, alternative example embodiments include an indentation 22 on outer surface 20. Indentation 22 assists receptacle 12 to contact vessel 100 and rotate receptacle 12 about axis of rotation 18.

Referring again to FIGS. 1-4, in example embodiments, handle 14 has an elongated portion 34 and at least one extension 36 or leg extending therefrom. Pivot point 16 is located at a distal end 38 of extension 36. Certain example embodiments have two extensions 36, each with pivot points 16 at distal ends 38, thereby forming axis of rotation 18 of receptacle 12 therebetween. In other example embodiments, a single pivot point 16 is located at distal end 38 of a single extension 36, the axis of rotation 18 being defined through pivot point 16. In example embodiments, elongated portion 34 also has a grip 40. Grip 40 is contoured to fit naturally within a user's hand. In certain embodiments, grip 40 includes a flange 42, which may be a terminal flange, to help a user hold handheld device 10 by providing a surface that rests atop a user's hand. Handle 14 also includes a ribbing to increase the structural rigidity of handheld device 10. A ribbing is included on elongated portion 34, extension 36, where elongated portion 34 meets extension 36, or some combination thereof. Other structural features to increase rigidity will be apparent to those skilled in the art. Referring to FIG. 7, in alternative embodiments, handle 14 has a first portion 44 extending in a first direction perpendicular to axis of rotation 18, and a second portion 46 extending at least partially in a second direction perpendicular to axis of rotation 18 and the first direction.

Referring again to FIGS. 1-4, in example embodiments, handheld device 10 has at least one protrusion 30 located adjacent to at least one pivot point 16. Protrusion 30 is located on a same side of axis of rotation 18 as extension 24. In certain example embodiments, receptacle 12 has at least one protrusion 30. Receptacle 12 is rotatable about axis of rotation 18 between a first position, where protrusion 30 is in contact with handle 14 preventing rotation in a first direction, and a second position, where protrusion 30 is not in contact with handle 14 and receptacle 12 is rotatable in the first direction and a second direction. For example, in FIGS. 1-3, handle 14 is in contact with protrusion 30 and receptacle 12 can only rotate in a clockwise direction because protrusion 30 prevents further rotation in a counterclockwise direction. In FIG. 4, for example, handle 14 is not in contact with protrusion 30 and receptacle 12 can rotate clockwise or counterclockwise about axis of rotation 18. In other example embodiments, handle 14 has at least one protrusion 30. Receptacle 12 is rotatable about axis of rotation 18 between a first position, where protrusion 30 is in contact with receptacle 12 preventing rotation in a first direction, and a second position, where protrusion 30 is not in contact with receptacle 12 and receptacle 12 is rotatable in the first direction and a second direction.

In example embodiments, handle 14 is orientated perpendicular relative to axis of rotation 18. And in certain example embodiments, handle 14 has a vertical alignment relative to receptacle 12 when protrusion 30 is in contact with at least one of handle 14 and receptacle 12.

In example embodiments, center of mass 32 is offset from axis of rotation 18. By having center of mass 32 offset from axis of rotation 18, unwanted rotation of receptacle 12 is reduced. Center of mass 32 is on an opposite side of axis of rotation 18 than protrusion 30, such that receptacle 12 is inclined to rotate about axis of rotation 18 due to the force of gravity creating a torque about axis of rotation 18 in a direction towards protrusion 30 until protrusion 30 contacts handle 14. Protrusion 30 prevents further rotation of receptacle 12 in the direction. Receptacle 12 remains free to rotate in an opposite direction in response to an external force applied to outer surface 20.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A handheld device for transferring a substance, comprising:
    a receptacle configured to receive and hold the substance, the receptacle pivotably mounted to a handle about two pivot points thereby forming an axis of rotation therebetween and rotatable about the axis of rotation in response to an external force applied to an outer surface of the receptacle.

2. The handheld device of claim 1, the outer surface of the receptacle further comprising an indentation.

3. The handheld device of claim 1, the receptacle further comprising an extension extending outward in a first direction perpendicular to the axis of rotation.

4. The handheld device of claim 3, the extension being located a first distance from a top edge of the receptacle and a second distance from a bottom of the receptacle, the second distance being greater than the first distance.

5. The handheld device of claim 1, the receptacle pivotably and directly mounted to the handle.

6. The handheld device of claim 1, the handle having a perpendicular orientation relative to the axis of rotation.

7. The handheld device of claim 1, the receptacle further comprising at least one protrusion and being rotatable about the axis of rotation between a first position, where the at least one protrusion is in contact with the handle preventing rotation in a first direction, and a second position, where the at least one protrusion is not in contact with the handle and the receptacle is rotatable in the first direction and a second direction.

8. The handheld device of claim 1, the handle further comprising at least one protrusion and the receptacle being rotatable about the axis of rotation between a first position, where the at least one protrusion is in contact with the receptacle preventing rotation in a first direction, and a second position, where the at least one protrusion is not in contact with the receptacle and the receptacle is rotatable in the first direction and a second direction.

9. The handheld device of claim 3, at least one of the handle and the receptacle further comprising at least one protrusion extending outwardly therefrom, the extension on a same side of the axis of rotation as the at least one protrusion.

10. The handheld device of claim 1, the receptacle further comprising a center of mass offset from the axis of rotation.

11. A handheld device for transferring a substance, comprising:
    a receptacle configured to receive and hold the substance, the receptacle pivotably mounted to a handle about at least one pivot point thereby forming an axis of rotation of the receptacle, and the axis of rotation being offset relative to a center of mass of the receptacle; and
    at least one of the receptacle and the handle comprising at least one protrusion, wherein the receptacle is rotatable about the axis of rotation between a first position, where the at least one protrusion is in contact with at least one of the handle and the receptacle preventing rotation in a first direction, and a second position, where the at least one protrusion is not in contact with at least one of the handle and the receptacle and the receptacle is rotatable in the first direction and a second direction.

12. The handheld device of claim 11, the handle having a perpendicular orientation relative to the axis of rotation.

13. The handheld device of claim 12, the handle being in a vertical alignment relative to the axis of rotation when the at least one protrusion is in contact with at least one of the handle and the receptacle.

14. The handheld device of claim 11, the receptacle rotatable about the axis of rotation in response to an external force applied to an outer surface of the receptacle.

15. A handheld device for transferring a substance, comprising:
- a receptacle configured to receive and hold the substance, the receptacle pivotably mounted to a handle about two pivot points thereby forming an axis of rotation of the receptacle therebetween, and the handle having a perpendicular orientation relative to the axis of rotation.

16. The handheld device of claim 15, the receptacle further comprising a center of mass offset from the axis of rotation.

17. The handheld device of claim 16, at least one of the receptacle and the handle comprising at least one protrusion, wherein the receptacle is rotatable about the axis of rotation between a first position, where the at least one protrusion is in contact with at least one of the handle and the receptacle preventing rotation in a first direction, and a second position, where the at least one protrusion is not in contact with at least one of the handle and the receptacle and the receptacle is rotatable in the first direction and a second direction.

18. The handheld device of claim 15, the handle further comprising an elongated portion and two extensions extending from the elongated portion, the two pivot points being formed at a distal end of each extension.

19. The handheld device of claim 1, wherein the receptacle is solely biased by gravity.

20. The handheld device of claim 1, wherein the receptacle is free of bias from a spring.

* * * * *